US012599888B2

(12) United States Patent
Cheng

(10) Patent No.: US 12,599,888 B2
(45) Date of Patent: Apr. 14, 2026

(54) SYNTHESIS REACTOR

(71) Applicant: National Kaohsiung University of Science and Technology, Kaohsiung (TW)

(72) Inventor: Jui-Hung Cheng, Kaohsiung City (TW)

(73) Assignee: NATIONAL KAOHSIUNG UNIVERSITY OF SCIENCE AND TECHNOLOGY, Kaohsiung (TW)

( * ) Notice: Subject to any disclaimer, the term of this patent is extended or adjusted under 35 U.S.C. 154(b) by 664 days.

(21) Appl. No.: 18/154,713

(22) Filed: Jan. 13, 2023

(65) Prior Publication Data

US 2023/0241573 A1      Aug. 3, 2023

(30) Foreign Application Priority Data

Jan. 28, 2022    (TW) .................................. 111103964

(51) Int. Cl.
B01J 19/18          (2006.01)
B01J 19/00          (2006.01)

(52) U.S. Cl.
CPC ........... B01J 19/18 (2013.01); B01J 19/0013 (2013.01); B01J 19/0066 (2013.01); B01J

*19/0073* (2013.01); *B01J 2219/00076* (2013.01); *B01J 2219/00189* (2013.01)

(58) Field of Classification Search
CPC .... B01J 19/00; B01J 19/0006; B01J 19/0013; B01J 19/0053; B01J 19/0066; B01J 19/0073; B01J 19/18; B01J 2219/00; B01J 2219/00049; B01J 2219/00051; B01J 2219/00074; B01J 2219/00076; B01J 2219/00087; B01J 2219/0009; B01J 2219/00189
See application file for complete search history.

(56) References Cited

U.S. PATENT DOCUMENTS

2013/0266488 A1* 10/2013 Kato ................... G21G 1/0005
422/310

* cited by examiner

*Primary Examiner* — Natasha E Young
(74) *Attorney, Agent, or Firm* — MUNCY, GEISSLER, OLDS & LOWE, P.C.

(57) ABSTRACT

A synthesis reactor including a container and a control unit is provided. The container includes an outer shell, an inner tank that is disposed in the outer shell and that cooperates with the outer shell to define an interlayer space therebetween, and a heater that is disposed in the interlayer space and that is attached directly to an outer surface of the inner tank. The control unit includes a controller that is electrically connected to the heater and that is configured to control heating temperature of the heater.

18 Claims, 4 Drawing Sheets

13

12

11

SYNTHESIS REACTOR

CROSS-REFERENCE TO RELATED APPLICATION

This application claims priority to Taiwanese Invention Patent Application No. 111103964, filed on Jan. 28, 2022.

FIELD

The disclosure relates to a synthesis reactor, and more particularly to a synthesis reactor that can directly heat up contents therein.

BACKGROUND

Referring to FIG. 1, a conventional synthesis reactor includes a heating base 11, a water container 12 that is disposed on a top surface of the heating base 11 and that is for containing water, and a reaction container 13 that is disposed inside the water container 12 and that is for containing a liquid mixture. The heating base 11 may be controlled to heat up the water container 12, thereby heating up the water in the water container 12. The conventional synthesis reactor is configured to heat up the liquid mixture by first heating up the water in the water container 12, and then heating up the reaction container 13 with the hot water in the water container 12. Such heating manner with the hot water often results in the temperature to which the reaction container 13 is heated up being inexact, and thus the reaction container 13 may not be heated enough to reach a target temperature set on the heating base 11. Furthermore, the conventional synthesis reactor requires additional space for the water container 12 for containing the hot water used for heating up the reaction container 13, making the overall size of the synthesis reactor relatively large but the actual capacity for containing the liquid mixture small.

SUMMARY

Therefore, an object of the disclosure is to provide a synthesis reactor that can alleviate at least one of the drawbacks of the prior art.

According to the disclosure, the synthesis reactor includes a container and a control unit. The container includes an outer shell, an inner tank that is disposed in the outer shell and that cooperates with the outer shell to define an interlayer space therebetween, and a heater that is disposed in the interlayer space and that is attached directly to an outer surface of the inner tank. The control unit includes a controller that is electrically connected to the heater, and that is configured to control heating temperature of the heater.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
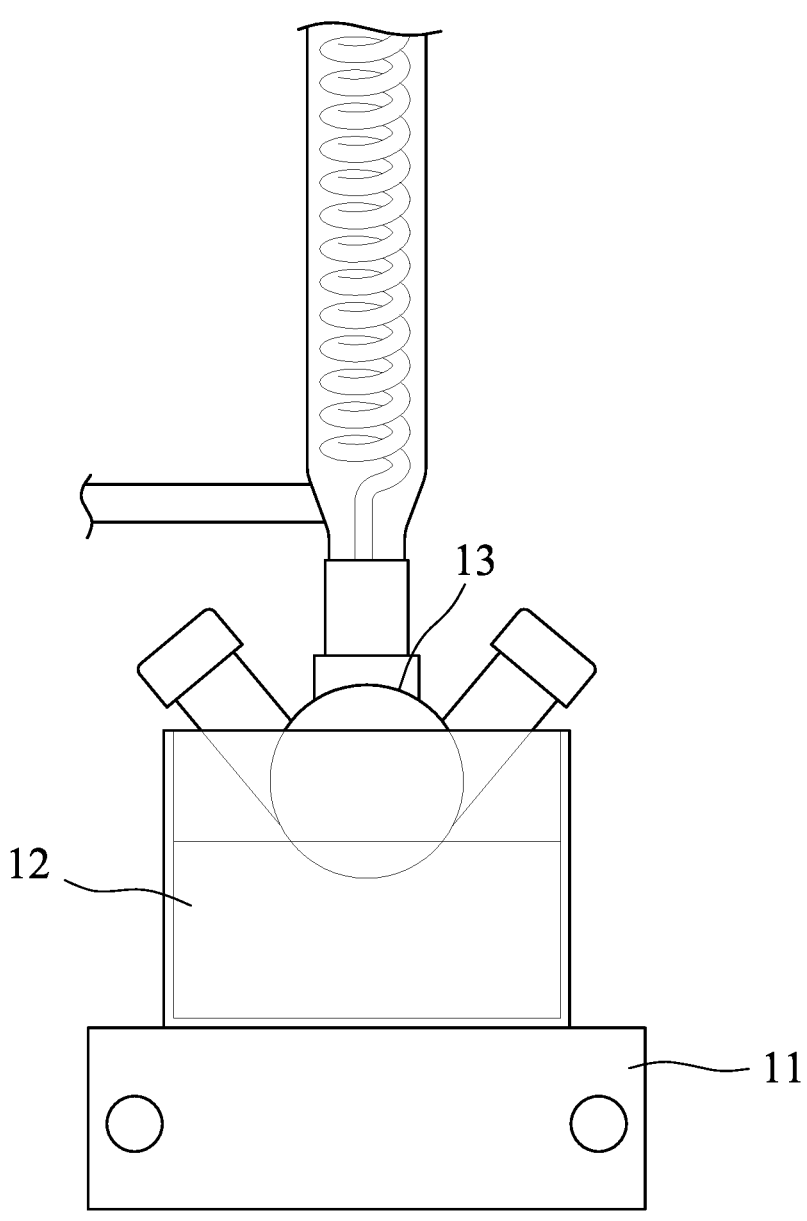
FIG. 1 is a schematic view illustrating a conventional synthesis reactor.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
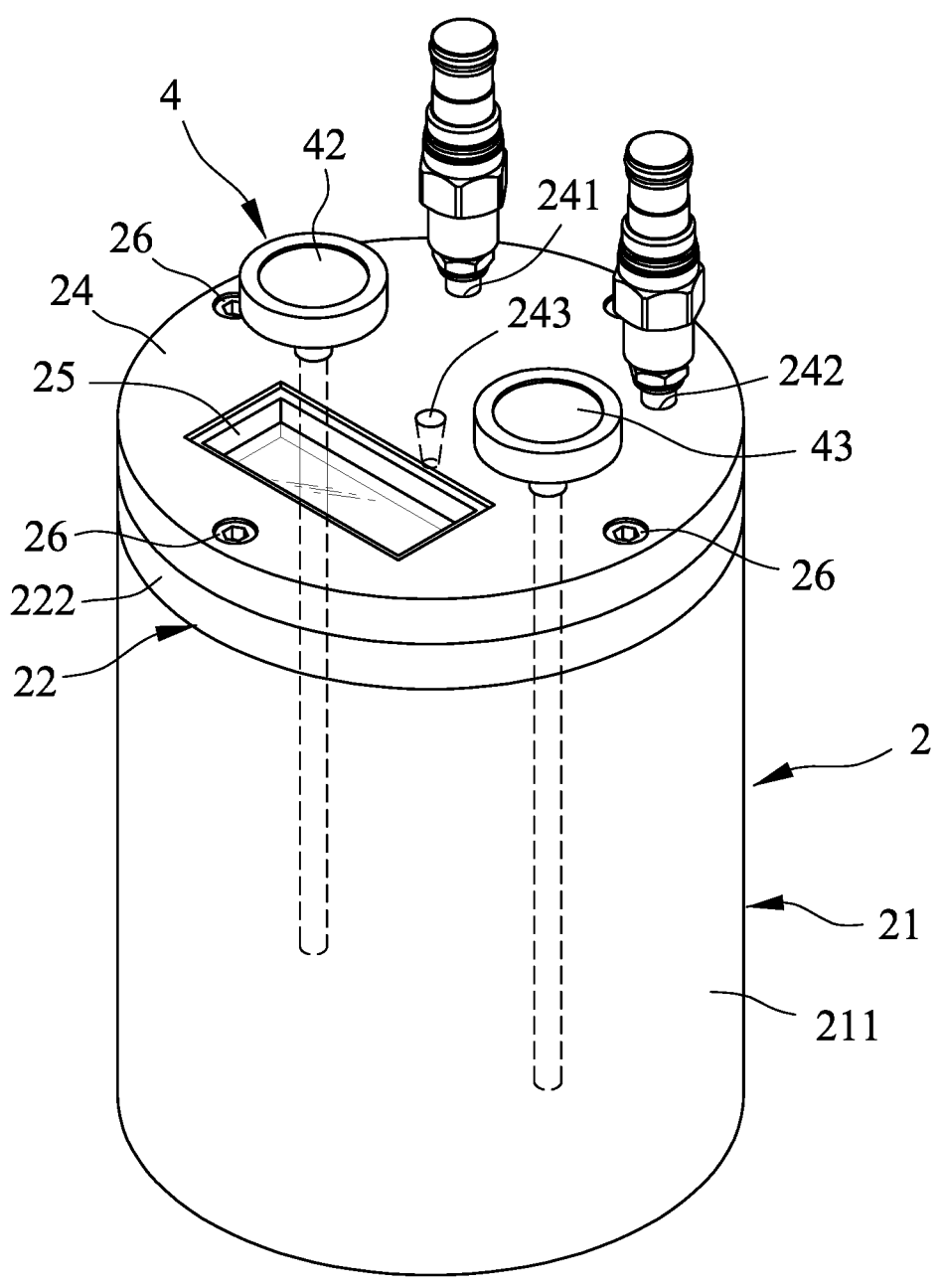
FIG. 2 is a perspective view illustrating a synthesis reactor according to an embodiment of the disclosure.
Figure 3:
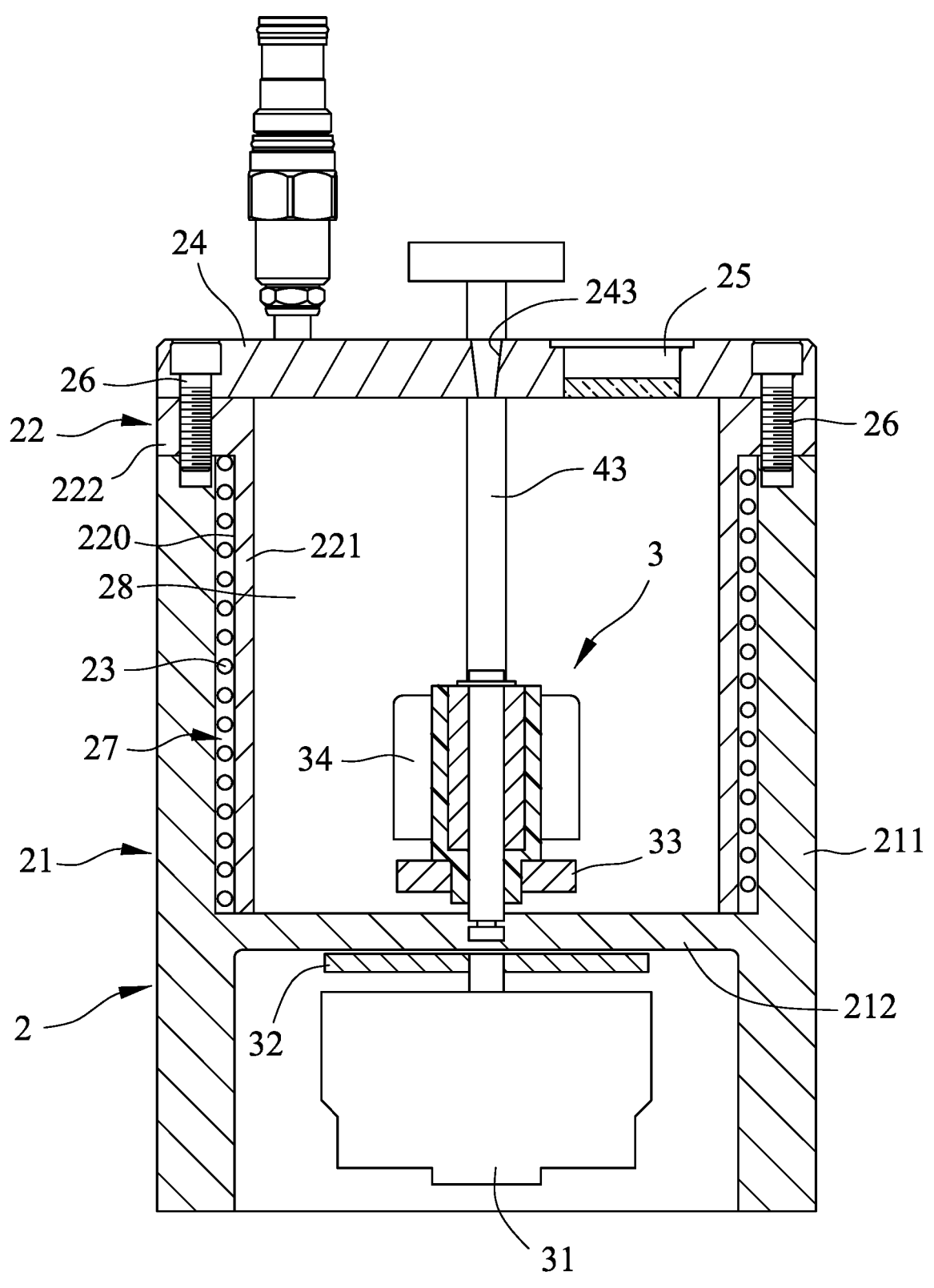
FIG. 3 is a cross-sectional view of the synthesis reactor.

Referring to FIGS. 2 and 3, a synthesis reactor according to an embodiment of the disclosure includes a container 2, a mixer 3, and a control unit 4. The container 2 includes an outer shell 21, an inner tank 22 that is disposed in the outer shell 21, a heater 23 that spirally surrounds and is attached directly to an outer surface 220 of the inner tank 22, a lid 24 that is removably disposed above the outer shell 21 and the inner tank 22, a transparent window 25 that is embedded in the lid 24, and a plurality of fasteners 26 that fasten the lid 24 to the outer shell 21 and the inner tank 22.

The outer shell 21 includes an outer surrounding wall 211 surrounding the inner tank 22, and a bottom wall 212 connected to a bottom edge of the outer surrounding wall 211. The inner tank 22 includes an inner surrounding wall 221 surrounded by the outer surrounding wall 211 and having a bottom edge that is connected to the bottom wall 212, and a flange 222 projecting radially and outwardly from a top edge of the inner surrounding wall 221 and lying on a top edge of the outer surrounding wall 211. The outer shell 21 and the inner tank 22 cooperatively define an interlayer space 27 therebetween, and the heater 23 is disposed in the interlayer space 27. The inner tank 22 further defines an inner space 28 therein. The lid 24 is disposed directly on the flange 222, and is formed with an input port 241, an output port 242, and a through hole 243 that is between the input port 241 and the output port 242, where the input port 241, the output port 242, and the through hole 243 are in spatial communication with the inner space 28. Each of the fasteners 26 extends through the lid 24 and the flange 222 and is fastened to the top edge of the outer surrounding wall 211, thereby fixing the lid 24, the outer shell 21, and the inner tank 22 together.

The mixer 3 includes a driving component 31 that is disposed outside the inner space 28 and that is disposed below the bottom wall 212, a magnetic component 32 that is connected to the driving component 31, a rotor 33 that is rotatably disposed on the bottom wall 212 and above the magnetic component 32, and a fan 34 that is co-rotatably mounted on the rotor 33. The rotor 33 and the fan 34 are disposed in the inner space 28. The driving component 31 may be a motor, and is configured to drive the magnetic component 32 to rotate when being powered up. The magnetic component 32 may be a magnet (e.g., a permanent magnet or an electromagnet), and the rotor 33 is configured to be magnetically attracted by the magnetic component 32 so as to co-rotate with the magnetic component 32, thereby driving the fan 34 to rotate in the inner space 28. For example, the rotor 33 is made of a magnetic material.

Figure 4:
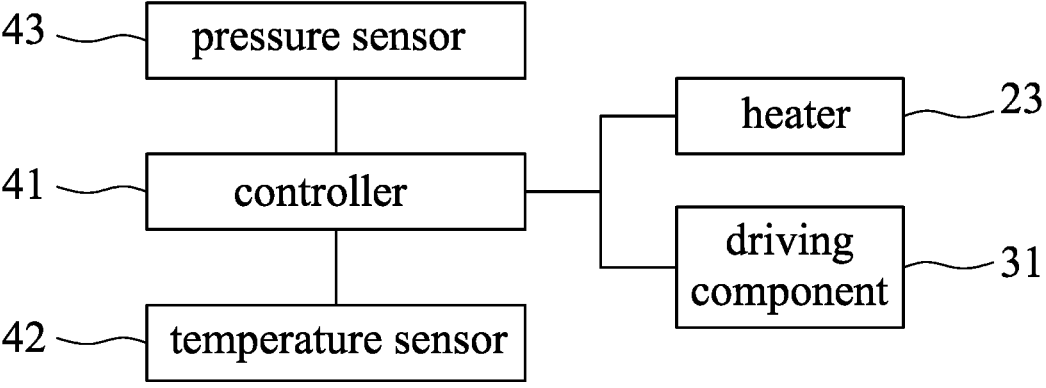
FIG. 4 is a block diagram illustrating electric connection among some components of the synthesis reactor.

Further referring to FIG. 4, the control unit 4 includes a controller 41 that is electrically connected to the heater 23 and the driving component 31, and a temperature sensor 42 and a pressure sensor 43 that are electrically connected to the controller 41. The temperature sensor 42 and the pressure sensor 43 are disposed on the lid 24 and partially extend into the inner tank 22 for measuring temperature and pressure inside the inner space 28, respectively.

The controller 41 includes, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), a system on a chip (SoC), etc.

The input port 241 may be connected to a pipeline to transport, for example, solution to be reacted or mixed into the inner space 28. Similarly, the output port 242 may be connected to another pipeline to discharge the reacted/mixed solution out of the inner tank 22. The through hole 243 has a frustoconical shape that tapers downwardly (i.e., from a large diameter to a small diameter), and may be connected to a spiral condenser (not shown) as an auxiliary mean for controlling the temperature in the inner space 28. The controller 41 is electrically connected to the heater 23, and is configured to control the heater 23 to heat up to a correct temperature accurately, and the heat generated by the heater 23 is to be transferred to the inner space 28 by heat conduction, thereby heating up contents in the inner space 28 with the correct temperature. The controller 41 is further configured to control a rotational speed of the driving component 31, thus driving the fan 34 mounted on the rotor 33 to stir the contents in the inner space 28 with a desired speed. The user may view the inner space 28 through the transparent window 25 to check the reaction process. The temperature sensor 42 and the pressure sensor 43, both partially extending into the inner tank 22 for contacting the contents in the inner space 28, are configured to measure the temperature and the pressure of the contents in real time and to send measurements of the temperature and the pressure to the controller 41. The controller 41 may adjust the temperature of the heater 23 and the rotational speed of the driving component 31 according to the real time measurements of the temperature and the pressure measured by the temperature sensor 42 and the pressure sensor 43. In some embodiments, the controller 41 may be connected to the spiral condenser to produce a faster cooling effect, so as to ensure the accuracy of the synthesis reaction. Data received by the controller 41 (e.g., the temperature and the pressure inside the inner space 28, the temperature of the heater 23, the rotational speed of the driving component 31, etc.) may be transmitted to the Internet or an electronic device through a wired or wireless network for monitoring or further analysis.

In summary, the synthesis reactor according to the disclosure may heat up the contents in the inner space 28 directly, and may monitor the parameters through the Internet or communicating signals in real time. The synthesis reactor does not require additional space for disposing a container for the hot water or a heating base for heating up the contents in the inner space 28, and thus the space saved may be used by the inner tank 22 for storing the reacted/mixed solution, thereby increasing the volume of the inner space 28 compared to the prior art having the same overall size.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A synthesis reactor comprising:
a container including an outer shell, an inner tank that is disposed in said outer shell and that cooperates with said outer shell to define an interlayer space therebetween, and a heater that is disposed in said interlayer space and that is attached directly to an outer surface of said inner tank; and
a control unit including a controller that is electrically connected to said heater, and that is configured to control heating temperature of said heater.

2. The synthesis reactor as claimed in claim 1, wherein said inner tank further defines an inner space therein.

3. The synthesis reactor as claimed in claim 2, further comprising a mixer that is disposed in said inner space and that is configured to stir contents of said inner tank by rotation.

4. The synthesis reactor as claimed in claim 3, wherein said mixer includes a driving component that is disposed outside said inner space, a magnetic component that is configured to be driven by said driving component to rotate, a rotor that is disposed in said inner space and that is configured to be magnetically attracted by said magnetic component so as to co-rotate with said magnetic component, and a fan that is mounted on said rotor so as to co-rotate with said rotor for stirring the contents of said inner tank.

5. The synthesis reactor as claimed in claim 4, wherein said driving component is a motor, and said controller is further electrically connected to said driving component and is further configured to control a rotational speed of said driving component.

6. The synthesis reactor as claimed in claim 5, wherein said control unit further includes a temperature sensor that is configured to measure temperature inside said inner space, and a pressure sensor that is configured to measure pressure inside said inner space, wherein said controller is further configured to control the heating temperature of said heater and the rotation speed of said driving component according to the temperature and the pressure measured respectively by said temperature sensor and said pressure sensor.

7. The synthesis reactor as claimed in claim 2, wherein said container further includes a lid that is removably disposed above said outer shell and said inner tank, and that is formed with an input port and an output port that are in spatial communication with said inner space.

8. The synthesis reactor as claimed in claim 7, wherein said outer shell includes an outer surrounding wall surrounding said inner tank, and a bottom wall connected to a bottom edge of said outer surrounding wall, wherein said inner tank includes an inner surrounding wall surrounded by said outer surrounding wall and having a bottom edge that is connected to said bottom wall, and a flange projecting radially and outwardly from a top edge of said inner surrounding wall and lying on a top edge of said outer surrounding wall, wherein said lid is disposed directly on said flange, and said flange is sandwiched between said lid and the top edge of said outer surrounding wall.

9. The synthesis reactor as claimed in claim 8, wherein said container further includes a plurality of fasteners that extend through said lid and said flange and that are fastened to the top edge of said outer surrounding wall.

10. The synthesis reactor as claimed in claim 8, wherein said inner surrounding wall of said inner tank and said bottom wall of said outer shell cooperatively define said inner space.

11. The synthesis reactor as claimed in claim 7, wherein said lid is further formed with a through hole that is in spatial communication with said inner space, and that is configured to allow a condenser to be inserted thereinto.

12. The synthesis reactor as claimed in claim 7, wherein said container further includes a transparent window embedded in said lid.

13. The synthesis reactor as claimed in claim 1, further comprising a mixer that is disposed in said inner tank and that is configured to stir contents of said inner tank by rotation, wherein said controller is further electrically connected to said mixer and is further configured to control rotation of said mixer.

14. The synthesis reactor as claimed in claim 13, wherein said container further includes a lid that is removably disposed above said outer shell and said inner tank, and that is formed with an input port and an output port in spatial communication with the inside of said inner tank.

15. The synthesis reactor as claimed in claim 14, wherein said control unit further includes a temperature sensor and a pressure sensor that are electrically connected to said controller, and that are disposed on said lid and partially extend into said inner tank.

16. The synthesis reactor as claimed in claim 14, wherein said lid is further formed with a frustoconical through hole that is between said input port and said output port, that is in spatial communication with the inside of said inner tank, and that is configured to allow a condenser to be inserted thereinto.

17. The synthesis reactor as claimed in claim 14, wherein said container further includes a transparent window embedded in said lid.

18. The synthesis reactor as claimed in claim 14, wherein said outer shell includes an outer surrounding wall that surrounds said inner tank, and a bottom wall that is connected to a bottom edge of said outer surrounding wall, wherein said inner tank includes an inner surrounding wall that is surrounded by said outer surrounding wall and that has a bottom edge connected to said bottom wall, and a flange that projects radially and outwardly from a top edge of said inner surrounding wall and that lies on and is connected to a top edge of said outer surrounding wall, wherein said lid is disposed directly on said flange, and said container further includes a plurality of fasteners that extend through said lid and said flange and that are fastened to the top edge of said outer surrounding wall.

* * * * *